United States Patent [19]

Garvey

[11] 4,269,302

[45] May 26, 1981

[54] MODULAR CONVEYOR UNITS AND SPIRAL CONVEYORS CONSTRUCTED THEREFROM

[75] Inventor: Francis J. Garvey, Newfield, N.J.

[73] Assignee: Garvey Corporation, Blue Anchor, N.J.

[21] Appl. No.: 23,293

[22] Filed: Mar. 23, 1979

[51] Int. Cl.³ .................... B65G 15/24; B65G 21/18
[52] U.S. Cl. ................................ 198/607; 198/778; 198/814; 198/841
[58] Field of Search ............... 198/607, 328, 778, 814, 198/831, 840, 841

[56] References Cited

U.S. PATENT DOCUMENTS

| | | | |
|---|---|---|---|
| 782,009 | 2/1905 | Dodge | 198/778 |
| 2,267,970 | 12/1941 | Boal | 198/778 |
| 2,677,456 | 5/1954 | McCann | 198/814 |
| 3,669,247 | 6/1972 | Pulver | 198/841 |
| 3,865,227 | 2/1975 | Kaak | 198/607 |
| 3,904,025 | 9/1975 | Garvey | 198/778 |

Primary Examiner—Jeffrey V. Nase
Attorney, Agent, or Firm—O'Brien and Marks

[57] ABSTRACT

Modular conveyor units are described as including a movable, continuous, spiral conveyor surface mounted on a frame. Spiral conveyors are constructed by stacking one or more of the modular units one atop the other depending upon the height of the spiral conveyor to be constructed, the conveyor surface of each modular unit forming a segment of the thus assembled spiral conveyor. The conveyor surfaces of all modular conveyor units are driven in the same direction to pass articles carried thereon from one unit to the next in the direction in which driven.

4 Claims, 7 Drawing Figures

MODULAR CONVEYOR UNITS AND SPIRAL CONVEYORS CONSTRUCTED THEREFROM

BACKGROUND OF THE INVENTION

1. Field of the Invention

This invention relates to an endless conveyor and more particularly to vertical, spiral conveyors that may be constructed of modular frames to varying heights as determined by the number of modular frames employed.

2. Description of the Prior Art

Vertical conveyors that provide a continuous, spiral conveying surface are known in the prior art. Such devices may include a flat, continuous belt driven from a common power source at spaced points along its length, the belt returning upon itself as shown in U.S. Pat. No. 2,267,970.

Vertical spiral conveyors may also be of the chain type in which flight attachments forming the conveying surface are secured to a continuous roller chain as shown in U.S. Pat. Nos. 2,564,533 and 2,911,091. As shown in U.S. Pat. No. 3,904,025, assigned to the same assignee as this patent application, continuous chain type conveyors may be attached to stacked, modular frames permitting the construction of conveyors of different heights. All of such prior art devices however are subject to the limitation of requiring a single, continuous conveyor surface.

SUMMARY OF THE INVENTION

The invention is summarized in that a modular, spiral conveyor unit having an endless spiral conveyor surface mounted on a frame means, is provided. A spiral conveyor assembly is constructed by stacking one or more of the modular units, one atop the other to the desired spiral conveyor height. The endless conveyor surface of each modular unit forms a curved segment of the resulting spiral conveyor such that when all modular conveyor units are driven in the same direction articles carried thereon are passed from one to the other in the direction to which driven.

OBJECTS OF THE INVENTION

An object of the present invention is to construct a spiral conveyor in a simple and economical manner.

A second object of the invention is to arrange a spiral conveyor in modular unit permitting the height of the assembly to be varied as needed.

A further object of this invention is to operate a plurality of modules from a common source of power.

Another object of the invention is to provide a spiral conveyor module with a means for maintaining a desirable chain tension.

An object of the invention is to provide a modular spiral conveyor unit with an endless conveyor surface so as to obviate the need for a continuous conveyor surface running the length of the assembly.

These and other objects will be apparent from the drawings and the following description of the invention.

DESCRIPTION OF A PREFERRED EMBODIMENT

Figure 1:
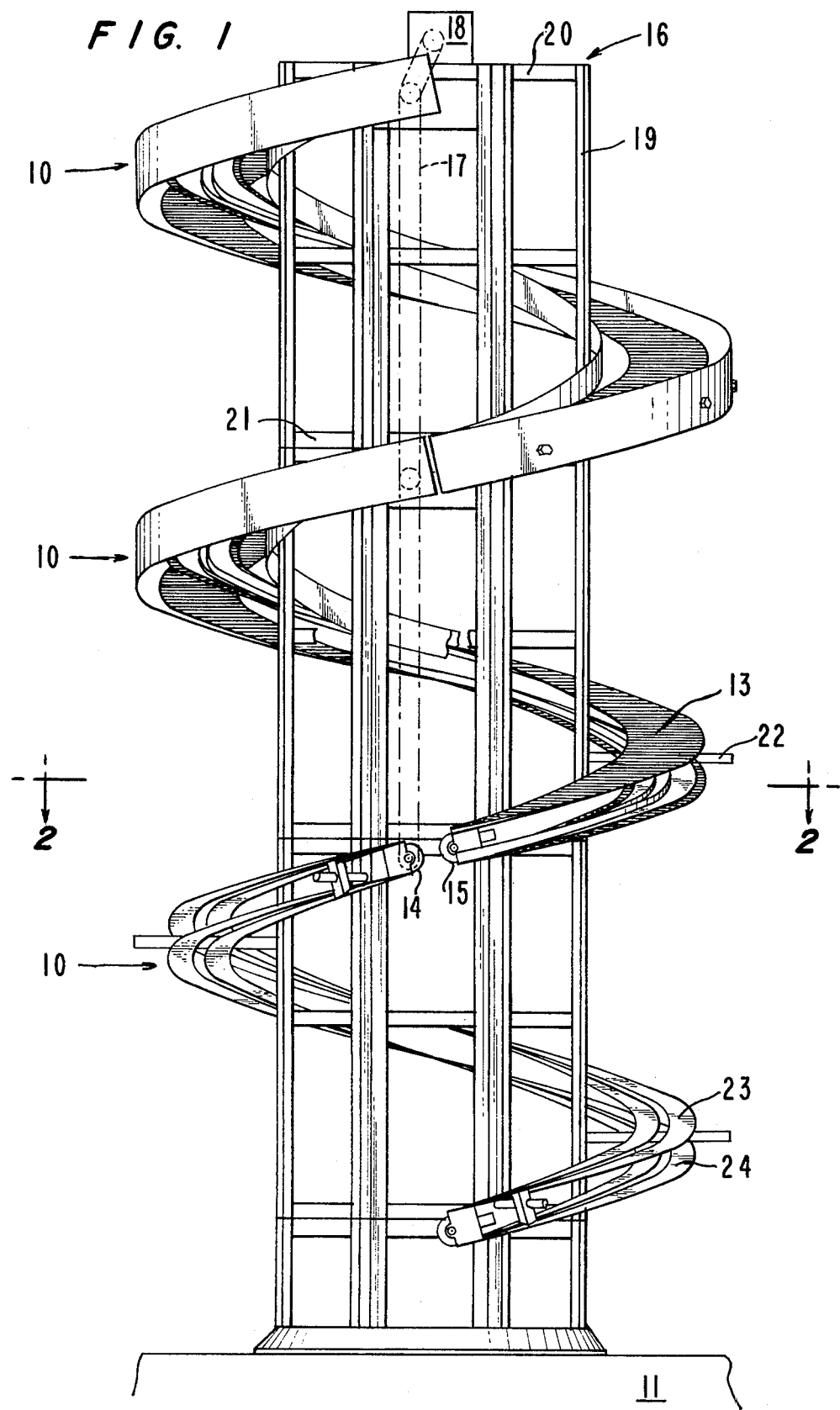
FIG. 1 is a side elevation view of a spiral conveyor formed of stacked, modular, self-contained conveyor units embodying the principles of the invention, certain parts being omitted.
Figure 2:
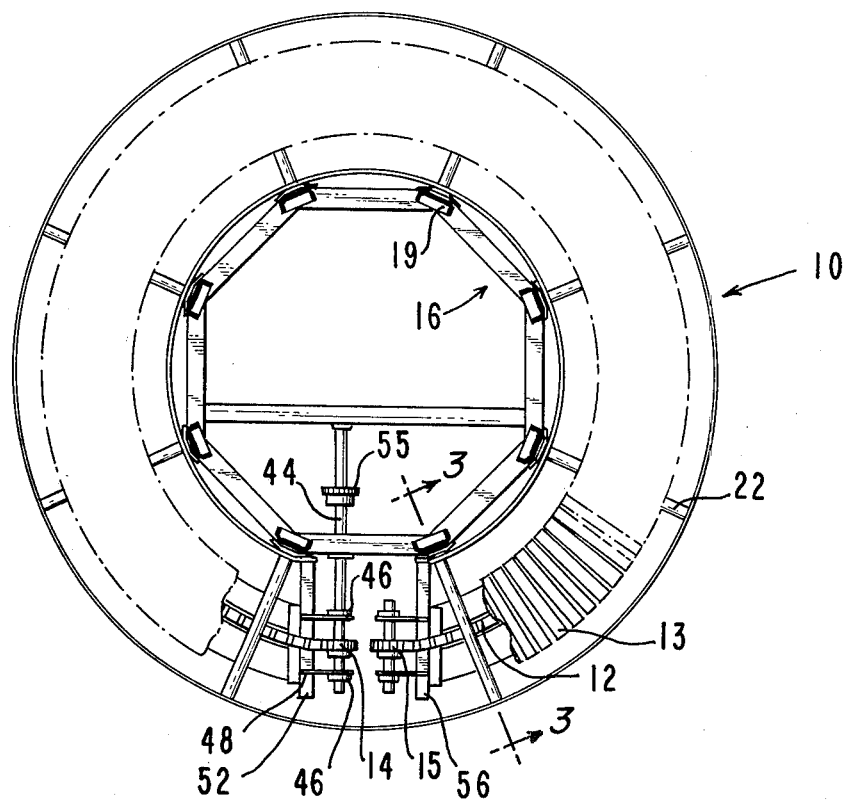
FIG. 2 is a cross-sectional view taken along lines 2—2 in FIG. 1, a portion of the endless conveyor surface being removed to illustrate drive and idler sprockets for the conveyor chain of a modular conveyor unit.

As illustrated in FIGS. 1 and 2, the present invention is embodied in a spiral conveyor constructed of a plurality of modular, self-contained spiral conveyor units designated generally by the reference numeral 10. The modular units 10 are stacked atop one another on a supporting base 11 made of heavy structural framing. Each modular conveyor unit 10 includes a conveyor chain 12 that forms part of an endless conveyor surface 13 in a spiral vertical path around an upper drive sprocket 14 and a lower adjustable idler sprocket 15 supported on a modular, octagonal frame designated generally as 16. The upper drive sprockets 14 of the modular conveyor units 10 are driven by a power chain 17 driven from a common power source such as a motor 18 mounted atop the uppermost conveyor module 10. Alternatively, when three or module units 10 are stacked to form a conveyor the motor 18, instead of being mounted atop the assembly, may be mounted on the center unit 10 and drive the upper and lower units as well, thus splitting the total drive load. Where particularly heavy loads are to be conveyed each modular unit 10 may be driven by an independent motor 18.

The octagonal frames 16 are constructed similarly to the frames shown and described in the aforementioned U.S. Pat. No. 3,904,025, incorporated herein by reference. Generally, each frame 16 is constructed of eight vertical elements 19 formed of angle iron or the like and attached at their ends to the corners of similar horizontal upper and lower parallel members 20 and 21 having octagonal configurations. Bracing may be provided intermediate the upper and lower member as required.

A tubular bracket 22 extends horizontally from each vertical element 19 radially away from the center of the octagonal frame. The brackets 22 are vertically positioned on successive vertical elements 19 at incrementally increased heights, beginning with a bracket near the bottom of a first element and ending with a bracket near the top of a last element adjacent the first element.

Figure 5:
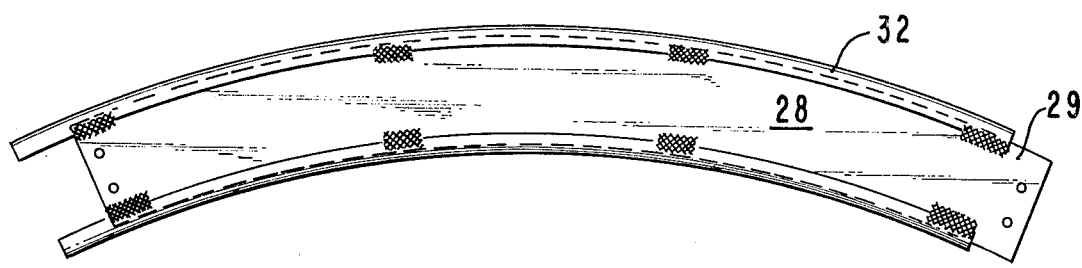
FIG. 5 is a plan view of a spiral track segment used for supporting the endless conveyor surface of a modular conveyor unit.
Figure 3:
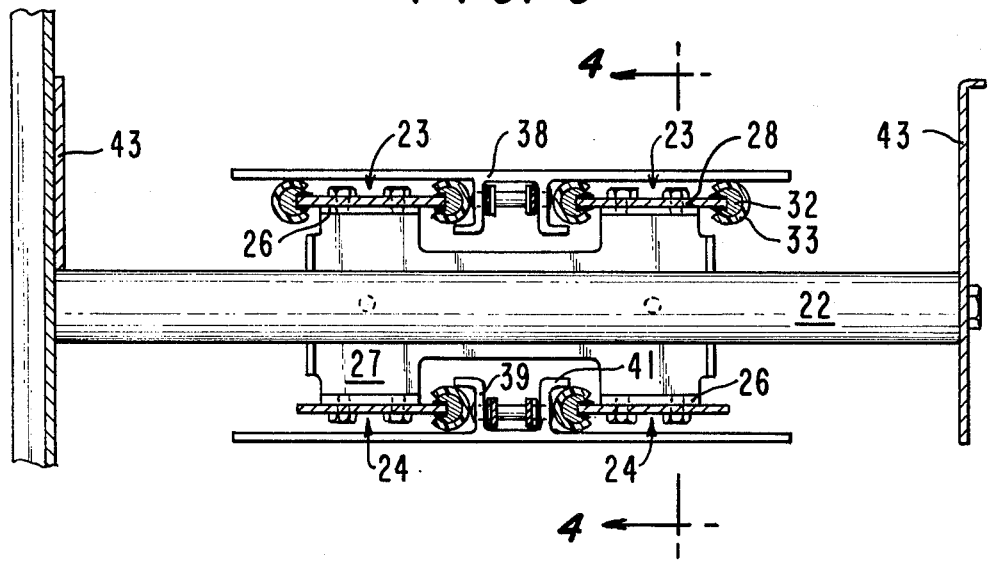
FIG. 3 is a partial cross-sectional view taken along lines 3—3 in FIG. 2.
Figure 4:
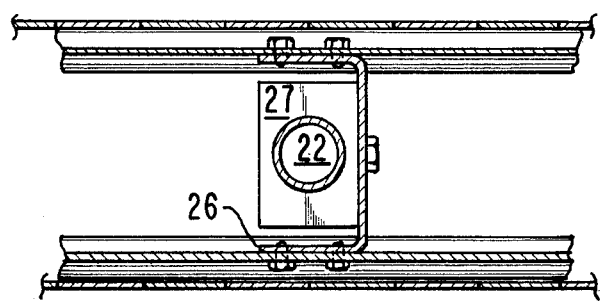
FIG. 4 is a cross-sectional view taken along lines 4—4 in FIG. 3.

As shown in FIGS. 3-5, the brackets 22 support upper and lower pairs of spaced tracks indicated generally at 23 and 24 curved to form a spiral path around the modular frame. Both pairs of upper and lower tracks 23 and 24 are secured to spaced flanges 26 provided on opposite sides of a channel member 27 attached to each bracket 22. The spaced pair of upper tracks 23 may be formed of flat, curved plastic plate segments 28, the edges 29 of which are detachably received in slots formed in expandible wear rods 32 made of plastic or the like.

Referring to FIG. 5, the wear rods 32 are secured to the plate segment 28 at various points as by welding and extend short of the end of the plate at one end and beyond at the opposite end. This structure facilitates the attachment of one plate segment 28 to the other on the flanges 26 of the respective channel members 27 to form each of the spaced pair of spiral upper tracks 23.

As shown in FIG. 3, the wear rods 32 on the plate segments 28 forming the upper tracks 23 may also be protected from wear by means of flexible, semicircular, plastic covers 33 designed to snap over the wear rods after the tracks 23 are assembled on the frame. The lower pair of spaced tracks 24 are assembled of plate segments 28 in the same fashion except only the inner adjacent edges of the respective tracks 24 are provided with wear rods 32 and plastic covers 33.

The conveyor chain 12 travels around each bracket 22 between the spaced upright flanges 26 on opposite sides of the channel member 27. As is shown in FIG. 3 the conveyor chain 12 may be of a conventional pin and roller link construction. As is known from the prior art, flight attachments 38 may be secured to the links of the chain to make up the endless conveyor surface 13.

Depending legs 39 and projecting feet 41 on the flight attachments 38 form grooves that slidably receive the adjacent, plastic covered edges of the spaced tracks 23 and 24, the underside of the flight attachments being supported upon the wear surfaces on the upper tracks 23. Brackets 22 may also be provided with guides 43 on opposite sides of the spaced pair of tracks 23 to prevent articles such as cartons carried on the modular conveyor units 10 from falling off.

The continuous conveyor chain 12 with flight attachments 38 secured thereto travels around the upper drive sprocket 14 and lower idler sprocket 16 of each modular conveyor unit 10 to complete one spiral loop around the vertical, longitudinal axis of the unit. As shown in FIG. 1, the upper drive sprocket 14 is spaced from the idler sprocket 15 of the modular conveyor unit above it so that the endless conveyor surface 13 carried by adjacent units 10 may freely pass around the respective sprockets without interference to the other.

As shown in FIG. 2, the drive sprocket 14 is affixed to an axle 44 supported in bearings 46 attached to the opposite legs of a U-shaped bracket 48 secured by welding or suitable fasteners to a support arm 52 formed of angle iron. The arm 52 projects from one side of the upper member 20, FIG. 1, parallel to and horizontally offset from a horizontal centerline passing through the centers of the one side and its opposite side of the octagonal configuration formed by the upper member 20. Power is transferred from motor 18 via chain 17 to a sprocket 55 at each module, each sprocket 55 driving its respective sprocket 14 through the axle 44 on which both sprockets are mounted.

Figure 6:
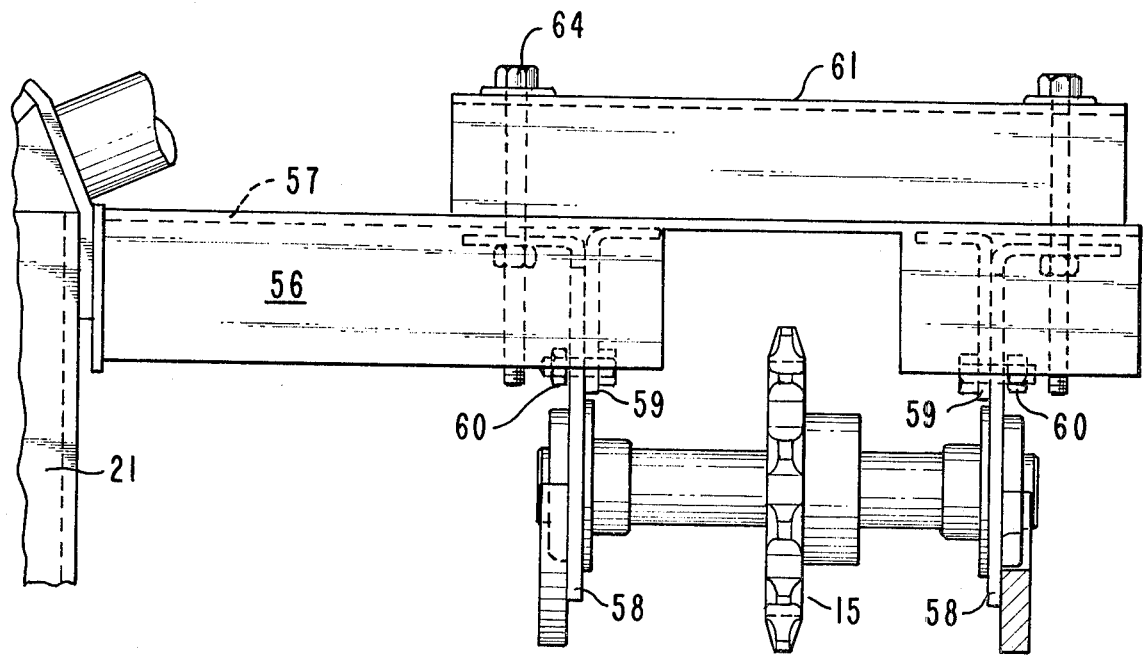
FIG. 6 is an enlarged plan view of the idler sprocket assembly shown in FIG. 2 and its associated conveyor chain tension adjusting means.
Figure 7:
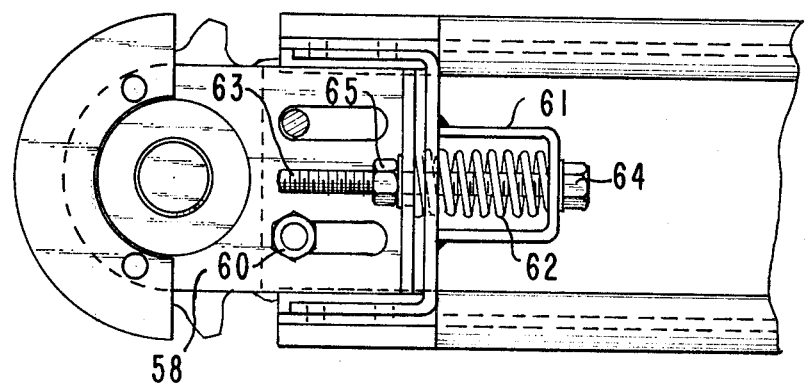
FIG. 7 is an end view of the idler sprocket assembly and conveyor chain tension adjusting means shown in FIG. 6.

Referring to FIGS. 6 and 7, the idler sprocket 15 of each modular unit 10 is mounted on a similar support arm 56 attached to the lower member 21 directly below the upper member 20. Support arm 56 carries idler sprocket 15 and extends parallel with support arm 52. The respective idler and drive sprockets 15 and 14 of each modular unit 19 are thus horizontally offset from vertical lines through each other for the reasons previously described.

The idler sprocket 15, unlike the drive sprocket 14, is carried on L-shaped brackets 58 adjustably secured to similar brackets 59 rigidly secured to a flange 57 of support 56. The brackets 58 and 59 are slidably secured together by means of headed bolts 60 that extend through adjacent and correspondingly spaced slots formed in the brackets which provide positive stops to limit the maximum slack in the chain.

The support arm 56 includes a U-shaped member 61 attached as by welding to the flange 57 of support 56 on the side opposite to that which brackets 59 are attached, confining compression springs 62 that extend through holes in the flange 57 to engage the brackets 58. The springs 62 are captured in this position by threaded bolts 63 that pass through the member 61, the flange, and brackets 58 and hold the chain under spring tension for a smooth conveyor operation.

The minimum slack or maximum tension in the chain is adjusted by turning the heads 64 of bolts 63 relative to the nuts 65, the compression springs 62 urging the brackets 58 relative to brackets 59 to the limit of the positive stop provided by the bolts 63. This permits an even tension to be maintained in the conveyor chain 12 carried on the idler sprocket 16 and provides for a smooth running endless conveyor surface 13.

The physical dimensions such as the diameter and height of the modular self-contained conveyor units 10 embodying the invention may be changed as desired, the number of such units stacked one upon the other determining the height of the spiral conveyor so constructed. Once vertically assembled the units 10 are secured together by any suitable fastener means and the common power source (motor 18) is mounted to a cross member affixed to the top of the uppermost unit as shown in FIG. 1. The drive chain 17 is then connected to the axles 44 of the respective drive sprockets 14 so all are driven simultaneously in the same direction.

As the spiral conveyor loop of the lower unit 10 ends near where that of the unit 10 immediately above it begins, articles are carried from one to the other of the modular conveyor units 10 when all are driven in the same direction. Each modular unit 10 provides a segment of the total spiral conveying surface. Therefore, the height of a spiral conveyor constructed of such modular units 10 can be readily varied by adding or removing units without the need for changing the conveying surface as in prior art devices.

Preferably, the endless conveyor surface 13 of each modular unit 100 completes a spiral path 360° around the frame 16, or an integral multiple thereof, permitting all drive sprockets 14, of stacked units 10 to be positioned one above the other. This in turn permits all sprockets 14 to be driven by a single and common power source (motor 18) with a minimum of complexity.

The above described invention presents the advantage of allowing rapid assembly of modules, since the conveyor surfaces are containing on each module, and need not be fitted to the assembled modular frames. A further advantage provided is that the conveyor surfaces may be kept under proper tension at all times without need for continuous adjustment.

The endless conveyor surface 13 of each unit 10 may however, complete a path of less than 360° in which event the drive sprockets 14 of stacked units 10 will be offset from one another. In this event separate conveyor chain drive motors may be provided for each module 10. Irrespective of the degree of turn of each endless conveyor surface 13 one must end near where the next above begins in order to form a vertical spiral conveyor.

Inasmuch as the present invention is subject to many variations, modifications and changes in detail, it is intended that all matter contained in the foregoing description or shown in the accompanying drawings, shall be interpreted as illustrative and not in a limiting sense.

What is claimed is:

1. A spiral conveyor assembly comprising
a plurality of similar modular spiral conveyor units each including a frame having a longitudinal axis, two pairs of parallel tracks supported on said frame defining a spiral path around said axis, a pair of sprockets supported by said frame near the respective ends of the spiral path, and an endless conveyor constructed to follow said tracks and engaging said sprockets;
said modular units being positioned along a common longitudinal axis with one end of the endless conveyor of one module adjacent one end of the endless conveyor of an adjacent module so as to form a continuous conveying path;
a third sprocket supported on each modular unit, said third sprocket being adapted to drive one of said pair of sprockets;
a power means mounted on one of said modular units; and
a power chain driven by said power means and engaging each of said third sprockets whereby power may be delivered from said power means to each of said endless conveyors.

2. A spiral conveyor assembly comprising
a plurality of similar modular spiral conveyor units each including a frame having a longitudinal axis, two pairs of parallel tracks supported on said frame defining a spiral path around said axis, a pair of sprockets supported by said frame near the respective ends of the spiral path, an endless conveyor constructed to follow said tracks and engaging said sprockets, and rods of a wear resistant material attached to the edges of said tracks;
said modular units being positioned along a common longitudinal axis with one end of the endless conveyor of one module adjacent one end of the endless conveyor of an adjacent module so as to form a continuous conveying path.

3. A spiral conveyor as claimed in claim 2 and further comprising
flexible plastic covers adapted to snap over said rods.

4. A spiral conveyor assembly formed of a plurality of similar modular spiral conveyor units, each comprising:
a frame having a longitudinal axis,
a plurality of first brackets extending from said frame;
upper and lower pairs of parallel tracks supported by said first brackets and defining a spiral path extending one or more full revolutions around said axis;
said tracks including curved flat plastic segments with rods of a wear resistant material attached to the edges thereof;
a first arm extending from said frame near the upper end of said track;
a drive sprocket supported by said first arm;
a second arm extending from said frame near the lower end of said track;
an idler sprocket supported by said second arm;
an endless conveyor including a chain with a plurality of flight attachments affixed thereto, said chain engaging said sprockets and said flight attachments having means to engage said tracks;
adjustable spring biasing means between said second arm and said idler sprocket to maintain constant conveyor chain tension.

* * * * *